United States Patent
Chishty (10) Patent No.: US 11,258,905 B2
(45) Date of Patent: Feb. 22, 2022

(54) TECHNIQUES FOR ERROR HANDLING IN A TASK ASSIGNMENT SYSTEM WITH AN EXTERNAL PAIRING SYSTEM

(71) Applicant: Afiniti, Ltd., Hamilton (BM)

(72) Inventor: Ain Chishty, Rockville, MD (US)

(73) Assignee: Afiniti, Ltd., Hamilton (BM)

( * ) Notice: Subject to any disclaimer, the term of this patent is extended or adjusted under 35 U.S.C. 154(b) by 0 days.

(21) Appl. No.: 17/162,187

(22) Filed: Jan. 29, 2021

(65) Prior Publication Data

US 2021/0243304 A1 Aug. 5, 2021

Related U.S. Application Data

(60) Provisional application No. 62/970,106, filed on Feb. 4, 2020.

(51) Int. Cl.
*H04M 3/523* (2006.01)
*H04M 3/51* (2006.01)

(52) U.S. Cl.
CPC ....... *H04M 3/5232* (2013.01); *H04M 3/5238* (2013.01)

(58) Field of Classification Search
None
See application file for complete search history.

(56) References Cited

U.S. PATENT DOCUMENTS

| | | |
|---|---|---|
| 5,155,763 A | 10/1992 | Bigus et al. |
| 5,206,903 A | 4/1993 | Kohler et al. |

(Continued)

FOREIGN PATENT DOCUMENTS

| | | |
|---|---|---|
| AU | 2008349500 C1 | 5/2014 |
| AU | 2009209317 B2 | 5/2014 |

(Continued)

OTHER PUBLICATIONS

Afiniti, "Afiniti® Enterprise Behavioral Pairing™ Improves Contact Center Performance," White Paper, retrieved online from URL: <http://www.afinitit.com/wp-content/uploads/2016/04/Afiniti_White-Paper_Web-Email.pdf> 2016, (11 pages).

(Continued)

*Primary Examiner* — Harry S Hong
(74) *Attorney, Agent, or Firm* — Wilmer Cutler Pickering Hale and Dorr LLP (57) ABSTRACT

Techniques for error handling in a task assignment system with an external pairing system are disclosed. In one particular embodiment, the techniques may be realized as a method for error handling in a task assignment system with an external pairing system comprising transmitting a request for the external pairing system to select a first pairing between one or more tasks awaiting assignment and one or more agents available for assignment, the first pairing to be selected according to a first pairing strategy; determining a timeout window to wait for the external pairing system to provide a response that identifies the first pairing; detecting an expiration of the timeout window without receiving the response; and, in response to detecting the expiration of the timeout window, selecting a second pairing between the one or more tasks and the one or more agents, the second pairing being selected according to a second pairing strategy.

27 Claims, 6 Drawing Sheets

(56) References Cited

U.S. PATENT DOCUMENTS

| | | |
|---|---|---|
| 5,327,490 A | 7/1994 | Cave |
| 5,537,470 A | 7/1996 | Lee |
| 5,702,253 A | 12/1997 | Bryce et al. |
| 5,825,869 A | 10/1998 | Brooks et al. |
| 5,903,641 A | 5/1999 | Tonisson |
| 5,907,601 A | 5/1999 | David et al. |
| 5,926,538 A | 7/1999 | Deryugin et al. |
| 6,021,428 A | 2/2000 | Miloslavsky |
| 6,044,355 A | 3/2000 | Crockett et al. |
| 6,044,468 A | 3/2000 | Osmond |
| 6,049,603 A | 4/2000 | Schwartz et al. |
| 6,052,460 A | 4/2000 | Fisher et al. |
| 6,064,731 A | 5/2000 | Flockhart et al. |
| 6,088,444 A | 7/2000 | Walker et al. |
| 6,163,607 A | 12/2000 | Bogart et al. |
| 6,222,919 B1 | 4/2001 | Hollatz et al. |
| 6,292,555 B1 | 9/2001 | Okamoto |
| 6,324,282 B1 | 11/2001 | McIllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |
| 6,496,580 B1 | 12/2002 | Chack |
| 6,504,920 B1 | 1/2003 | Okon et al. |
| 6,519,335 B1 | 2/2003 | Bushnell |
| 6,519,568 B1 | 2/2003 | Harvey et al. |
| 6,535,600 B1 | 3/2003 | Fisher et al. |
| 6,535,601 B1 | 3/2003 | Flockhart et al. |
| 6,570,980 B1 | 5/2003 | Baruch |
| 6,587,556 B1 | 7/2003 | Judkins et al. |
| 6,603,854 B1 | 8/2003 | Judkins et al. |
| 6,639,976 B1 | 10/2003 | Shellum et al. |
| 6,661,889 B1 | 12/2003 | Flockhart et al. |
| 6,704,410 B1 | 3/2004 | McFarlane et al. |
| 6,707,904 B1 | 3/2004 | Judkins et al. |
| 6,714,643 B1 | 3/2004 | Gargeya et al. |
| 6,744,878 B1 | 6/2004 | Komissarchik et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,895,083 B1 | 5/2005 | Bers et al. |
| 6,922,466 B1 | 7/2005 | Peterson et al. |
| 6,937,715 B2 | 8/2005 | Delaney |
| 6,956,941 B1 | 10/2005 | Duncan et al. |
| 6,970,821 B1 | 11/2005 | Shambaugh et al. |
| 6,978,006 B1 | 12/2005 | Polcyn |
| 7,023,979 B1 | 4/2006 | Wu et al. |
| 7,039,166 B1 | 5/2006 | Peterson et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,068,775 B1 | 6/2006 | Lee |
| 7,092,509 B1 | 8/2006 | Mears et al. |
| 7,103,172 B2 | 9/2006 | Brown et al. |
| 7,158,628 B2 | 1/2007 | McConnell et al. |
| 7,184,540 B2 | 2/2007 | Dezonno et al. |
| 7,209,549 B2 | 4/2007 | Reynolds et al. |
| 7,231,032 B2 | 6/2007 | Nevman et al. |
| 7,231,034 B1 | 6/2007 | Rikhy et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1 | 9/2007 | Wu et al. |
| 7,353,388 B1 | 4/2008 | Gilman et al. |
| 7,372,952 B1 | 5/2008 | Wu et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,798,876 B2 | 9/2010 | Mix |
| 7,826,597 B2 | 11/2010 | Berner et al. |
| 7,864,944 B2 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,175,253 B2 | 5/2012 | Knott et al. |
| 8,229,102 B2 | 7/2012 | Knott et al. |
| 8,249,245 B2 | 8/2012 | Jay et al. |
| 8,295,471 B2 | 10/2012 | Spottiswoode et al. |
| 8,300,798 B1 | 10/2012 | Wu et al. |
| 8,306,212 B2 | 11/2012 | Arora |
| 8,359,219 B2 | 1/2013 | Chishti et al. |
| 8,433,597 B2 | 4/2013 | Chishti et al. |
| 8,472,611 B2 | 6/2013 | Chishti |
| 8,565,410 B2 | 10/2013 | Chishti et al. |
| 8,634,542 B2 | 1/2014 | Spottiswoode et al. |
| 8,644,490 B2 | 2/2014 | Stewart |
| 8,670,548 B2 | 3/2014 | Xie et al. |
| 8,699,694 B2 | 4/2014 | Chishti et al. |
| 8,712,821 B2 | 4/2014 | Spottiswoode |
| 8,718,271 B2 | 5/2014 | Spottiswoode |
| 8,724,797 B2 | 5/2014 | Chishti et al. |
| 8,731,178 B2 | 5/2014 | Chishti et al. |
| 8,737,595 B2 | 5/2014 | Chishti et al. |
| 8,750,488 B2 | 6/2014 | Spottiswoode et al. |
| 8,761,380 B2 | 6/2014 | Kohler et al. |
| 8,781,100 B2 | 7/2014 | Spottiswoode et al. |
| 8,781,106 B2 | 7/2014 | Afzal |
| 8,792,630 B2 | 7/2014 | Chishti et al. |
| 8,824,658 B2 | 9/2014 | Chishti |
| 8,831,207 B1 | 9/2014 | Agarwal |
| 8,856,869 B1 | 10/2014 | Brinskelle |
| 8,879,715 B2 | 11/2014 | Spottiswoode et al. |
| 8,903,079 B2 | 12/2014 | Xie et al. |
| 8,913,736 B2 | 12/2014 | Kohler et al. |
| 8,929,537 B2 | 1/2015 | Chishti et al. |
| 8,938,063 B1 | 1/2015 | Hackbarth et al. |
| 8,995,647 B2 | 3/2015 | Li et al. |
| 9,020,137 B2 | 4/2015 | Chishti et al. |
| 9,025,757 B2 | 5/2015 | Spottiswoode et al. |
| 9,215,323 B2 | 12/2015 | Chishti |
| 9,277,055 B2 | 3/2016 | Spottiswoode et al. |
| 9,300,802 B1 | 3/2016 | Chishti |
| 9,426,296 B2 | 8/2016 | Chishti et al. |
| 9,712,676 B1 | 7/2017 | Chishti |
| 9,712,679 B2 | 7/2017 | Chishti et al. |
| 9,781,269 B2 | 10/2017 | Chishti et al. |
| 9,787,841 B2 | 10/2017 | Chishti et al. |
| 9,930,180 B1 | 3/2018 | Kan et al. |
| 9,942,405 B1 | 4/2018 | Kan et al. |
| RE46,986 E | 8/2018 | Chishti et al. |
| 10,116,800 B1 | 10/2018 | Kan et al. |
| 10,135,987 B1 | 11/2018 | Chishti et al. |
| RE47,201 E | 1/2019 | Chishti et al. |
| 10,284,727 B2 | 5/2019 | Kan et al. |
| 10,404,861 B2 | 9/2019 | Kan et al. |
| 2001/0032120 A1 | 10/2001 | Stuart et al. |
| 2001/0044896 A1 | 11/2001 | Schwartz et al. |
| 2002/0018554 A1 | 2/2002 | Jensen et al. |
| 2002/0046030 A1 | 4/2002 | Haritsa et al. |
| 2002/0059164 A1 | 5/2002 | Shtivelman |
| 2002/0082736 A1 | 6/2002 | Lech et al. |
| 2002/0110234 A1 | 8/2002 | Walker et al. |
| 2002/0111172 A1 | 8/2002 | DeWolf et al. |
| 2002/0131399 A1 | 9/2002 | Philonenko |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |

(56) References Cited

U.S. PATENT DOCUMENTS

| | | |
|---|---|---|
| 2002/0184069 A1 | 12/2002 | Kosiba et al. |
| 2002/0196845 A1 | 12/2002 | Richards et al. |
| 2003/0002653 A1 | 1/2003 | Uckun |
| 2003/0059029 A1 | 3/2003 | Mengshoel et al. |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0096050 A1 | 5/2004 | Das et al. |
| 2004/0098274 A1 | 5/2004 | Dezonno et al. |
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0116240 A1 | 5/2007 | Foley et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0153996 A1 | 7/2007 | Hansen |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0211881 A1 | 9/2007 | Parker-Stephen |
| 2007/0219816 A1 | 9/2007 | Van Luchene et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0118052 A1 | 5/2008 | Houmaidi et al. |
| 2008/0144803 A1 | 6/2008 | Jaiswal et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0205611 A1 | 8/2008 | Jordan et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0249083 A1 | 10/2009 | Forlenza et al. |
| 2009/0304172 A1 | 12/2009 | Becerra et al. |
| 2009/0305172 A1 | 12/2009 | Tanaka et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142689 A1 | 6/2010 | Hansen et al. |
| 2010/0142698 A1 | 6/2010 | Spottiswoode et al. |
| 2010/0158238 A1 | 6/2010 | Saushkin |
| 2010/0183138 A1 | 7/2010 | Spottiswoode et al. |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2011/0206199 A1 | 8/2011 | Arora |
| 2012/0051536 A1 | 3/2012 | Chishti et al. |
| 2012/0051537 A1 | 3/2012 | Chishti et al. |
| 2012/0183131 A1 | 7/2012 | Kohler et al. |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |
| 2013/0051545 A1 | 2/2013 | Ross et al. |
| 2013/0251137 A1 | 9/2013 | Chishti et al. |
| 2013/0287202 A1 | 10/2013 | Flockhart et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0119533 A1 | 5/2014 | Spottiswoode et al. |
| 2014/0270133 A1 | 9/2014 | Conway et al. |
| 2014/0341370 A1 | 11/2014 | Li et al. |
| 2015/0055772 A1 | 2/2015 | Klemm et al. |
| 2015/0281448 A1 | 10/2015 | Putra et al. |
| 2016/0080573 A1 | 3/2016 | Chishti |
| 2017/0013131 A1 | 1/2017 | Craib |
| 2017/0064080 A1 | 3/2017 | Chishti et al. |
| 2017/0064081 A1 | 3/2017 | Chishti et al. |
| 2017/0316438 A1 | 11/2017 | Konig et al. |
| 2018/0316793 A1 | 11/2018 | Kan et al. |
| 2018/0316794 A1 | 11/2018 | Kan et al. |
| 2019/0222697 A1 | 7/2019 | Kan et al. |
| 2019/0370714 A1* | 12/2019 | Liubyvyi ........... G06Q 10/0633 |

FOREIGN PATENT DOCUMENTS

| | | |
|---|---|---|
| AU | 2009311534 B2 | 8/2014 |
| AU | 2015203175 A1 | 7/2015 |
| AU | 2015243001 A1 | 11/2015 |
| CN | 101093590 A | 12/2007 |
| CN | 102164073 A | 8/2011 |
| CN | 102390184 A | 3/2012 |
| CN | 102555536 A | 7/2012 |
| CN | 202965525 U | 6/2013 |
| CN | 203311505 U | 11/2013 |
| CN | 102301688 B | 5/2014 |
| CN | 102017591 B | 11/2014 |
| EP | 0493292 A2 | 7/1992 |
| EP | 0863651 A2 | 9/1998 |
| EP | 0949793 A1 | 10/1999 |
| EP | 1011974 A1 | 6/2000 |
| EP | 1032188 A1 | 8/2000 |
| EP | 1107557 A2 | 6/2001 |
| EP | 1335572 A2 | 8/2003 |
| EP | 2338270 B1 | 4/2018 |
| GB | 2339643 A | 2/2000 |
| JP | 11-098252 A | 4/1999 |
| JP | 2000-069168 A | 3/2000 |
| JP | 2000-078291 A | 3/2000 |
| JP | 2000-078292 A | 3/2000 |

(56) References Cited

FOREIGN PATENT DOCUMENTS

| | | | |
|---|---|---|---|
| JP | 2000-092213 A | 3/2000 | |
| JP | 2000-507420 A | 6/2000 | |
| JP | 2000-236393 A | 8/2000 | |
| JP | 2000-253154 A | 9/2000 | |
| JP | 2001-292236 A | 10/2001 | |
| JP | 2001-518753 A | 10/2001 | |
| JP | 2002-297900 A | 10/2002 | |
| JP | 3366565 B2 | 1/2003 | |
| JP | 2003-187061 A | 7/2003 | |
| JP | 2004-056517 A | 2/2004 | |
| JP | 2004-227228 A | 8/2004 | |
| JP | 2006-345132 A | 12/2006 | |
| JP | 2007-324708 A | 12/2007 | |
| JP | 2009-081627 A | 4/2009 | |
| JP | 2011-511533 A | 4/2011 | |
| JP | 2011-511536 A | 4/2011 | |
| JP | 2012-075146 A | 4/2012 | |
| JP | 5421928 B2 | 2/2014 | |
| JP | 5631326 B2 | 11/2014 | |
| JP | 5649575 B2 | 1/2015 | |
| JP | 2015-514268 A | 5/2015 | |
| JP | 2015-514371 A | 5/2015 | |
| KR | 10-2002-0044077 A | 6/2002 | |
| KR | 10-2013-0099554 A | 9/2013 | |
| MX | 316118 | 12/2013 | |
| MX | 322251 | 7/2014 | |
| NZ | 587100 B | 10/2013 | |
| NZ | 587101 B | 10/2013 | |
| NZ | 591486 B | 1/2014 | |
| NZ | 592781 B | 3/2014 | |
| PH | 1-2010-501704 | 2/2014 | |
| PH | 1-2010-501705 | 2/2015 | |
| PH | 1-2011-500868 | 6/2015 | |
| WO | WO-1999/17517 A1 | 4/1999 | |
| WO | WO-00/70849 A2 | 11/2000 | |
| WO | WO-2001/063894 A2 | 8/2001 | |
| WO | WO-2006/124113 A2 | 11/2006 | |
| WO | WO-2009/097018 A1 | 8/2009 | |
| WO | WO-2009/097210 A1 | 8/2009 | |
| WO | WO-2010/053701 A2 | 5/2010 | |
| WO | WO-2011/081514 A1 | 7/2011 | |
| WO | WO-2013/148453 A1 | 10/2013 | |
| WO | WO-201 5/019806 A1 | 2/2015 | |
| WO | WO-2016/048290 A1 | 3/2016 | |

OTHER PUBLICATIONS

Anonymous, (2006) "Performance Based Routing in Profit Call Centers," The Decision Makers' Direct, located at www.decisioncraft.com, Issue Jun. 2002, (3 pages).
Chen, G., et al., "Enhanced Locality Sensitive Clustering in High Dimensional Space", Transactions on Electrical and Electronic Materials, vol. 15, No. 3, Jun. 25, 2014, pp. 125-129 (5 pages).
Cleveland, William S., "Robust Locally Weighted Regression and Smoothing Scatterplots," Journal of the American Statistical Association, vol. 74, No. 368, pp. 829-836 (Dec. 1979).
Cormen, T.H., et al., "Introduction to Algorithms", Third Edition, Chapter 26 and 29, 2009, (116 pages).
Gans, N. et al., "Telephone Call Centers: Tutorial, Review and Research Prospects," Manufacturing & Service Operations Management, vol. 5, No. 2, 2003, pp. 79-141, (84 pages).
International Preliminary Report on Patentability and Written Opinion issued in connection with PCT/US2009/066254 dated Jun. 14, 2011, (6 pages).
International Search Report and Written Opinion issued by the European Patent Office as International Searching Authority for PCT/IB2016/001762 dated Feb. 20, 2017, (15 pages).
International Search Report and Written Opinion issued by the European Patent Office as International Searching Authority for PCT/IB2016/001776 dated Mar. 3, 2017, (16 pages).
International Search Report and Written Opinion issued by the European Patent Office as International Searching Authority for PCT/IB2017/000570 dated Jun. 30, 2017, (13 pages).
International Search Report and Written Opinion issued by the European Patent Office as International Searching Authority for PCT/IB2018/000434 dated Jun. 20, 2018, (14 pages).
International Search Report and Written Opinion issued in connection with PCT/IB2018/000886 dated Dec. 4, 2018, (13 pages).
International Search Report and Written Opinion issued in connection with PCT/IB2018/000907 dated Nov. 26, 2018, (11 pages).
International Search Report issued in connection with PCT/US/2009/054352 dated Mar. 12, 2010, (5 pages).
International Search Report issued in connection with PCT/US2008/077042 dated Mar. 13, 2009, (3 pages).
International Search Report issued in connection with PCT/US2009/031611 dated Jun. 3, 2009, (5 pages).
International Search Report issued in connection with PCT/US2009/061537 dated Jun. 7, 2010, (5 pages).
International Search Report issued in connection with PCT/US2009/066254 dated Feb. 24, 2010, (4 pages).
International Search Report issued in connection with PCT/US2013/033261 dated Jun. 14, 2013, (3 pages).
International Search Report issued in connection with PCT/US2013/033265 dated Jul. 9, 2013, (2 pages).
International Search Report issued in connection with PCT/US2013/033268 dated May 31, 2013, (2 pages).
Ioannis Ntzoufras "Bayesian Modeling Using Winbugs An Introduction", Department of Statistics, Athens University of Economics and Business, Wiley-Interscience, A John Wiley & Sons, Inc., Publication, Chapters, Jan. 1, 2007, pp. 155-220 (67 pages).
Koole, G. et al., "An Overview of Routing and Staffing Algorithms in Multi-Skill Customer Contact Centers," Manuscript, Mar. 6, 2006, (42 pages).
Koole, G., "Performance Analysis and Optimization in Customer Contact Centers," Proceedings of the Quantitative Evaluation of Systems, First International Conference, Sep. 27-30, 2004, (4 pages).
Nocedal, J. and Wright, S. J., "Numerical Optimization," Chapter 16 Quadratic Programming, 2006, pp. 448-496 (50 pages).
Ntzoufras, "Bayesian Modeling Using Winbugs". Wiley Interscience, Chapter 5, Normal Regression Models, Oct. 18, 2007, Redacted version, pp. 155-220 (67 pages).
Press, W. H. and Rybicki, G. B., "Fast Algorithm for Spectral Analysis of Unevenly Sampled Data," The Astrophysical Journal, vol. 338, Mar. 1, 1989, pp. 277-280 (4 pages).
Riedmiller, M. et al., "A Direct Adaptive Method for Faster Backpropagation Learning: The RPROP Algorithm," 1993 IEEE International Conference on Neural Networks, San Francisco, CA, Mar. 28-Apr. 1, 1993, 1:586-591 (8 pages).
Stanley et al., "Improving Call Center Operations Using Performance-Based Routing Strategies," California Journal of Operations Management, 6(1), 24-32, Feb. 2008; retrieved from http://userwww.sfsu.edu/saltzman/Publist.html (9 pages).
Written Opinion of the International Searching Authority issued in connection with PCT/US2009/054352 dated Mar. 12, 2010, (5 pages).
Written Opinion of the International Searching Authority issued in connection with PCT/US2008/077042 dated Mar. 13, 2009, (6 pages).
Written Opinion of the International Searching Authority issued in connection with PCT/US2009/031611 dated Jun. 3, 2009, (7 pages).
Written Opinion of the International Searching Authority issued in connection with PCT/US2009/061537 dated Jun. 7, 2010, (10 pages).
Written Opinion of the International Searching Authority issued in connection with PCT/US2009/066254 dated Feb. 24, 2010, (5 pages).
Written Opinion of the International Searching Authority issued in connection with PCT/US2013/033261 dated Jun. 14, 2013, (7 pages).
Written Opinion of the International Searching Authority issued in connection with PCT/US2013/033265 dated Jul. 9, 2013, (7 pages).
Written Opinion of the International Searching Authority issued in connection with PCT/US2013/033268 dated May 31, 2013, (7 pages).

* cited by examiner

Misconfiguration Handling Method
500

TECHNIQUES FOR ERROR HANDLING IN A TASK ASSIGNMENT SYSTEM WITH AN EXTERNAL PAIRING SYSTEM

CROSS-REFERENCE TO RELATED APPLICATIONS

This patent application claims priority to U.S. Provisional Patent Application No. 62/970,106, filed Feb. 4, 2020, which is hereby incorporated by reference herein in its entirety.

FIELD OF THE DISCLOSURE

The present disclosure generally relates to task assignment systems and, more particularly, to techniques for error handling in a task assignment system with an external pairing system.

BACKGROUND OF THE DISCLOSURE

A typical pairing system algorithmically assigns tasks arriving at a task assignment system to agents available to handle those tasks. At times, the task assignment system may be in an "L1 state" and have agents available and waiting for assignment to tasks. At other times, the task assignment system may be in an "L2 state" and have tasks waiting in one or more queues for an agent to become available for assignment. At yet other times, the task assignment system may be in an "L3" state and have multiple agents available and multiple tasks waiting for assignment.

Some traditional pairing systems assign tasks to agents ordered based on time of arrival, and agents receive tasks ordered based on the time when those agents became available. This strategy may be referred to as a "first-in, first-out," "FIFO," or "round-robin" strategy. For example, in an L2 environment, when an agent becomes available, the task at the head of the queue would be selected for assignment to the agent.

Some task assignment systems prioritize some types of tasks ahead of other types of tasks. For example, some tasks may be high-priority tasks, while other tasks are low-priority tasks. Under a FIFO strategy, high-priority tasks will be assigned ahead of low-priority tasks.

Other traditional pairing systems may implement a performance-based routing (PBR) strategy for prioritizing higher-performing agents for task assignment. Under PBR, for example, the highest-performing agent among available agents receives the next available task.

"Behavioral Pairing" or "BP" strategies, for assigning tasks to agents, improve upon traditional pairing methods. BP targets balanced utilization of agents while improving overall task assignment system performance potentially beyond what FIFO or PBR methods achieve in practice.

Thus, it may be understood that there may be a need for techniques that enable a task assignment system to use high-performing pairing strategies (e.g., BP strategies) that improve upon traditional pairing strategies.

SUMMARY OF THE DISCLOSURE

Techniques for error handling in a task assignment system with an external pairing system are disclosed. In one particular embodiment, the techniques may be realized as a method for error handling in a task assignment system with an external pairing system comprising transmitting, by at least one computer processor communicatively coupled to and configured to operate in the task assignment system, to the external pairing system over an application programming interface, a request for the external pairing system to select a first pairing between one or more tasks awaiting assignment and one or more agents available for assignment, the first pairing to be selected according to a first pairing strategy; determining, by the at least one computer processor, a timeout window to wait for the external pairing system to provide a response that identifies the first pairing; detecting, by the at least one computer processor, an expiration of the timeout window without receiving the response; and in response to detecting the expiration of the timeout window, selecting, by the at least one computer processor, a second pairing between the one or more tasks and the one or more agents, the second pairing being selected according to a second pairing strategy.

In accordance with other aspects of this particular embodiment, the task assignment system is a contact center system.

In accordance with other aspects of this particular embodiment, the first pairing strategy is a behavioral pairing strategy.

In accordance with other aspects of this particular embodiment, the second pairing strategy is one of a first-in, first-out strategy and a performance-based routing strategy.

In accordance with other aspects of this particular embodiment, the second pairing may be selected by an internal pairing system of the task assignment system.

In accordance with other aspects of this particular embodiment, the method may further comprise, in response to detecting the expiration of the timeout window, transitioning from a first mode to a second mode, wherein the first mode corresponds to one of a full control mode and a shared control mode; and the second mode corresponds to an error response mode in which an internal pairing system of the task assignment system assumes control of pairing the one or more tasks with the one or more agents.

In accordance with other aspects of this particular embodiment, the one or more tasks may be associated with a label that indicates that the one or more tasks should be paired according to the first pairing strategy, wherein the method may further comprise overriding the label in response to detecting the expiration of the timeout window.

In accordance with other aspects of this particular embodiment, the method may further comprise accessing, by the at least one computer processor, one or more configuration parameters associated with the external pairing system, the one or more configuration parameters identifying a hidden queue of the task assignment system that is hidden from the external pairing system; determining, by the at least one computer processor, that the hidden queue includes one or more second tasks that are designated to be paired by the external pairing system; and in response to determining that the hidden queue includes the one or more second tasks that are designated to be paired by the external pairing system, selecting, by the at least one computer processor, a third pairing between the one or more second tasks and the one or more agents, the third pairing being selected according to the second pairing strategy.

In accordance with other aspects of this particular embodiment, the method may further comprise determining, by the at least one computer processor, a second timeout window to wait for a second task to be assigned, the second task being stored in a queue; detecting, by the at least one computer processor, an expiration of the second timeout window; and in response to detecting the expiration of the second timeout window, selecting, by the at least one computer processor, a third pairing between the second task and the one or more agents, the third pairing being selected according to the second pairing strategy.

In another particular embodiment, the techniques may be realized as a system for error handling in a task assignment system with an external pairing system comprising at least one computer processor communicatively coupled to and configured to operate in the task assignment system, wherein the at least one computer processor is further configured to perform the steps in the above-described method.

In another particular embodiment, the techniques may be realized as an article of manufacture for error handling in a task assignment system with an external pairing system comprising a non-transitory processor readable medium and instructions stored on the medium, wherein the instructions are configured to be readable from the medium by at least one computer processor communicatively coupled to and configured to operate in the task assignment system and thereby cause the at least one computer processor to operate so as to perform the steps in the above-described method.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

A typical pairing system algorithmically assigns tasks arriving at a task assignment system to agents available to handle those tasks. At times, the task assignment system may be in an "L1 state" and have agents available and waiting for assignment to tasks. At other times, the task assignment system may be in an "L2 state" and have tasks waiting in one or more queues for an agent to become available for assignment. At yet other times, the task assignment system may be in an "L3" state and have multiple agents available and multiple tasks waiting for assignment. An example of a task assignment system is a contact center system that receives contacts (e.g., telephone calls, internet chat sessions, emails, etc.) to be assigned to agents.

Some traditional pairing systems assign tasks to agents ordered based on time of arrival, and agents receive tasks ordered based on the time when those agents became available. This strategy may be referred to as a "first-in, first-out," "FIFO," or "round-robin" strategy. For example, in an L2 environment, when an agent becomes available, the task at the head of the queue would be selected for assignment to the agent.

Other traditional pairing systems may implement a performance-based routing (PBR) strategy for prioritizing higher-performing agents for task assignment. Under PBR, for example, the highest-performing agent among available agents receives the next available task.

"Behavioral Pairing" or "BP" strategies, for assigning tasks to agents that improve upon traditional pairing methods. BP targets balanced utilization of agents while improving overall task assignment system performance potentially beyond what FIFO or PBR methods achieve in practice. This is a remarkable achievement inasmuch as BP acts on the same tasks and same agents as FIFO or PBR methods, approximately balancing the utilization of agents as FIFO provides, while improving overall task assignment system performance beyond what either FIFO or PBR provides in practice. BP improves performance by assigning agent and task pairs in a fashion that takes into consideration the assignment of potential subsequent agent and task pairs such that, when the benefits of multiple assignments are aggregated, they may exceed those of FIFO and PBR strategies.

Various BP strategies may be used, such as a diagonal model BP strategy or a network flow BP strategy. These task assignment strategies and others are described in detail for a contact center context in, e.g., U.S. Pat. Nos. 9,300,802; 9,781,269; 9,787,841; and 9,930,180; all of which are hereby incorporated by reference herein. BP strategies may be applied in an L1 environment (agent surplus, one task; select among multiple available/idle agents), an L2 environment (task surplus, one available/idle agent; select among multiple tasks in queue), and an L3 environment (multiple agents and multiple tasks; select among pairing permutations).

When a pairing system is integrated into a task assignment system, handling errors that arise in association with implementing the pairing strategy (e.g., failures, outages, misconfigurations, dropped or delayed communications, etc.) may be straightforward given that the task assignment system can readily access information and/or controls used to monitor, detect, and recover from such errors. As explained in detail below, embodiments of the present disclosure relate to techniques for error handling in a task assignment system with an external pairing system, where the ability of the task assignment system to monitor, detect, and/or recover from errors may be more limited.

The description herein describes network elements, computers, and/or components of a system and method for pairing strategies in a task assignment system that may include one or more modules. As used herein, the term "module" may be understood to refer to computing software, firmware, hardware, and/or various combinations thereof. Modules, however, are not to be interpreted as software which is not implemented on hardware, firmware, or recorded on a non-transitory processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 1:
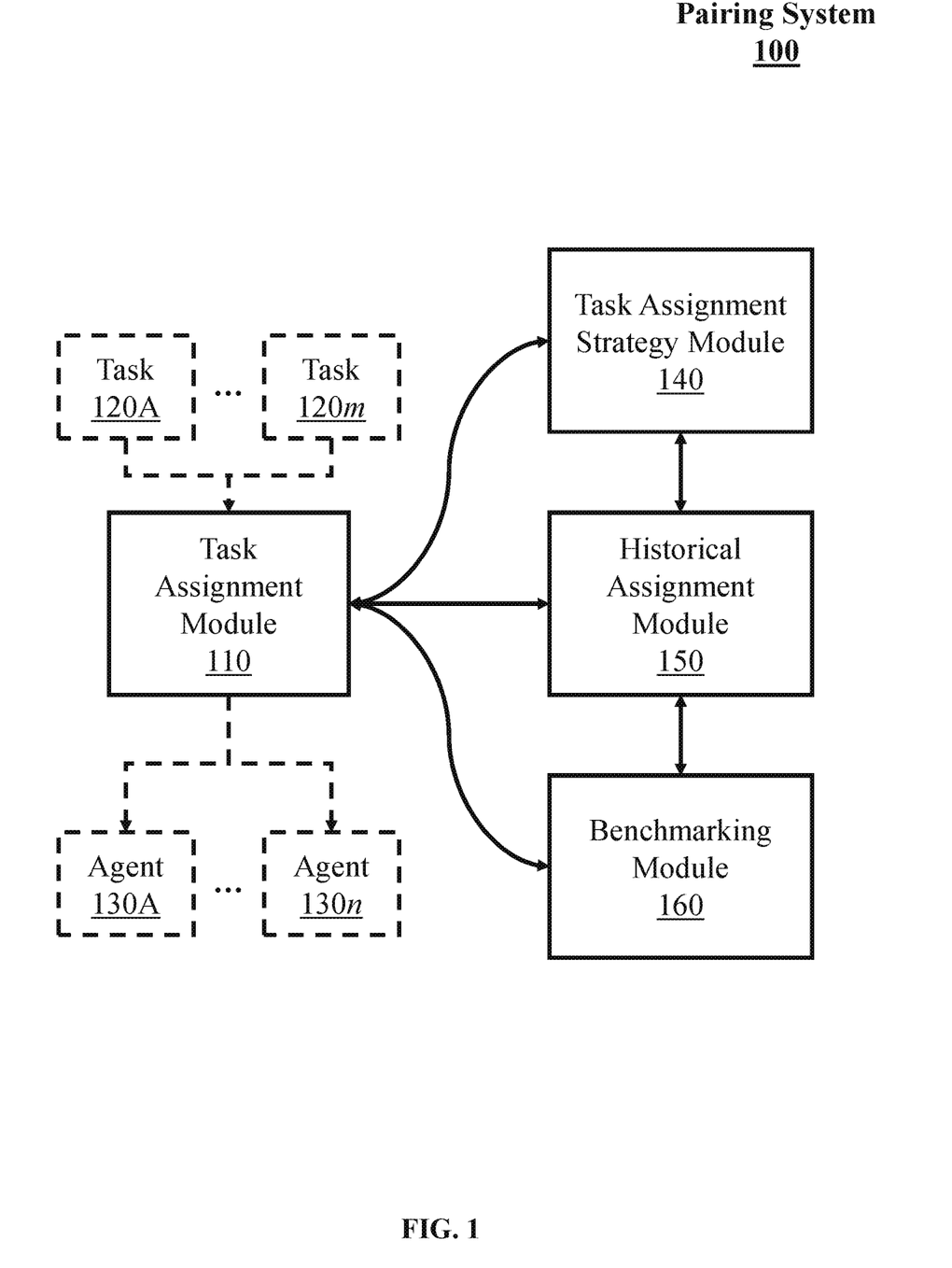
FIG. 1 shows a block diagram of a pairing system according to embodiments of the present disclosure.

FIG. 1 shows a block diagram of a pairing system 100 according to embodiments of the present disclosure. The pairing system 100 may be included in a task assignment system (e.g., contact center system) or incorporated in a component or module (e.g., a pairing module) of a task assignment system for helping to assign tasks (e.g., contacts) among various agents.

The pairing system 100 may include a task assignment module 110 that is configured to pair (e.g., match, assign, route) incoming tasks to available agents. In the example of FIG. 1, m tasks 120A-120m are received over a given period, and n agents 130A-130n are available during the given period. Each of the m tasks may be assigned to one of the n agents for servicing or other types of task processing. In the example of FIG. 1, m and n may be arbitrarily large finite integers greater than or equal to one. In a real-world task assignment system, such as a contact center system, there may be dozens, hundreds, etc. of agents logged into the contact center system to interact with contacts during a shift, and the contact center system may receive dozens, hundreds, thousands, etc. of contacts (e.g., telephone calls, internet chat sessions, emails, etc.) during the shift.

In some embodiments, a task assignment strategy module 140 may be communicatively coupled to and/or configured to operate in the pairing system 100. The task assignment strategy module 140 may implement one or more task assignment strategies (or "pairing strategies") for assigning individual tasks to individual agents (e.g., pairing contacts with contact center agents). A variety of different task assignment strategies may be devised and implemented by the task assignment strategy module 140. In some embodiments, a FIFO strategy may be implemented in which, for example, the longest-waiting agent receives the next available task (in L1 environments) or the longest-waiting task is assigned to the next available agent (in L2 environments). In other embodiments, a PBR strategy for prioritizing higher-performing agents for task assignment may be implemented. Under PBR, for example, the highest-performing agent among available agents receives the next available task. In yet other embodiments, a BP strategy may be used for optimally assigning tasks to agents using information about either tasks or agents, or both. Various BP strategies may be used, such as a diagonal model BP strategy or a network flow BP strategy. See U.S. Pat. Nos. 9,300,802; 9,781,269; 9,787,841; and 9,930,180.

In some embodiments, a historical assignment module 150 may be communicatively coupled to and/or configured to operate in the pairing system 100 via other modules such as the task assignment module 110 and/or the task assignment strategy module 140. The historical assignment module 150 may be responsible for various functions such as monitoring, storing, retrieving, and/or outputting information about task-agent assignments that have already been made. For example, the historical assignment module 150 may monitor the task assignment module 110 to collect information about task assignments in a given period. Each record of a historical task assignment may include information such as an agent identifier, a task or task type identifier, offer or offer set identifier, outcome information, or a pairing strategy identifier (i.e., an identifier indicating whether a task assignment was made using a BP strategy, or some other pairing strategy such as a FIFO or PBR pairing strategy).

In some embodiments and for some contexts, additional information may be stored. For example, in a call center context, the historical assignment module 150 may also store information about the time a call started, the time a call ended, the phone number dialed, and the caller's phone number. For another example, in a dispatch center (e.g., "truck roll") context, the historical assignment module 150 may also store information about the time a driver (i.e., field agent) departs from the dispatch center, the route recommended, the route taken, the estimated travel time, the actual travel time, the amount of time spent at the customer site handling the customer's task, etc.

In some embodiments, the historical assignment module 150 may generate a pairing model or a similar computer processor-generated model based on a set of historical assignments for a period of time (e.g., the past week, the past month, the past year, etc.), which may be used by the task assignment strategy module 140 to make task assignment recommendations or instructions to the task assignment module 110.

In some embodiments, a benchmarking module 160 may be communicatively coupled to and/or configured to operate in the pairing system 100 via other modules such as the task assignment module 110 and/or the historical assignment module 150. The benchmarking module 160 may benchmark the relative performance of two or more pairing strategies (e.g., FIFO, PBR, BP, etc.) using historical assignment information, which may be received from, for example, the historical assignment module 150. In some embodiments, the benchmarking module 160 may perform other functions, such as establishing a benchmarking schedule for cycling among various pairing strategies, tracking cohorts (e.g., base and measurement groups of historical assignments), etc. Benchmarking is described in detail for the contact center context in, e.g., U.S. Pat. No. 9,712,676, which is hereby incorporated by reference herein.

In some embodiments, the benchmarking module 160 may output or otherwise report or use the relative performance measurements. The relative performance measurements may be used to assess the quality of a pairing strategy to determine, for example, whether a different pairing strategy (or a different pairing model) should be used, or to measure the overall performance (or performance gain) that was achieved within the task assignment system while it was optimized or otherwise configured to use one pairing strategy instead of another.

Figure 2:
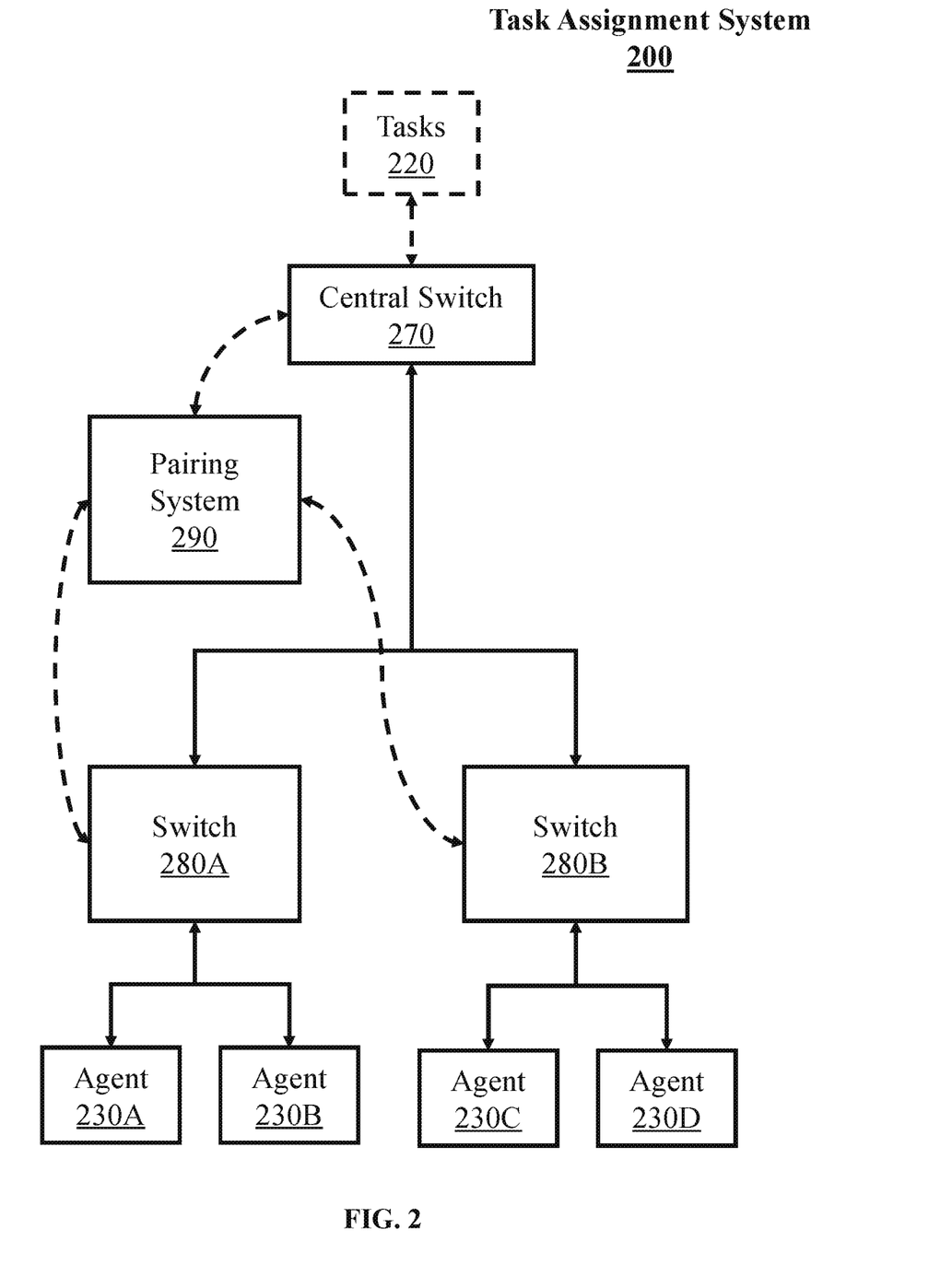
FIG. 2 shows a block diagram of a task assignment system according to embodiments of the present disclosure.

FIG. 2 shows a block diagram of a task assignment system 200 according to embodiments of the present disclosure. The task assignment system 200 may include a central switch 270. The central switch 270 may receive incoming tasks 220 (e.g., telephone calls, internet chat sessions, emails, etc.) or support outbound connections to contacts via a dialer, a telecommunications network, or other modules (not shown). The central switch 270 may include routing hardware and software for helping to route tasks among one or more queues (or subcenters), or to one or more Private Branch Exchange ("PBX") or Automatic Call Distribution (ACD) routing components or other queuing or switching components within the task assignment system 200. The central switch 270 may not be necessary if there is only one queue (or subcenter), or if there is only one PBX or ACD routing component in the task assignment system 200.

If more than one queue (or subcenter) is part of the task assignment system 200, each queue may include at least one switch (e.g., switches 280A and 280B). The switches 280A and 280B may be communicatively coupled to the central switch 270. Each switch for each queue may be communicatively coupled to a plurality (or "pool") of agents. Each switch may support a certain number of agents (or "seats") to be logged in at one time. At any given time, a logged-in agent may be available and waiting to be connected to a task, or the logged-in agent may be unavailable for any of a number of reasons, such as being connected to another task, performing certain post-call functions such as logging information about the call, or taking a break. In the example of FIG. 2, the central switch 270 routes tasks to one of two queues via switch 280A and switch 280B, respectively. Each of the switches 280A and 280B are shown with two agents each. Agents 230A and 230B may be logged into switch 280A, and agents 230C and 230D may be logged into switch 280B.

The task assignment system 200 may also be communicatively coupled to an integrated pairing system 290. The pairing system 290 may be native to (or built in) the task assignment system 200 (i.e., "first-party") or may be a service provided by, for example, a third-party vendor. In the example of FIG. 2, the pairing system 290 may be communicatively coupled to one or more switches in the switch system of the task assignment system 200, such as central switch 270, switch 280A, and switch 280B. In some embodiments, switches of the task assignment system 200 may be communicatively coupled to multiple pairing systems. In some embodiments, the pairing system 290 may be embedded within a component of the task assignment system 200 (e.g., embedded in or otherwise integrated with a switch). An example of the pairing system 290 is the pairing system 100, which is described above.

The pairing system 290 may receive information from a switch (e.g., switch 280A) about agents logged into the switch (e.g., agents 230A and 230B) and about incoming tasks 220 via another switch (e.g., central switch 270) or, in some embodiments, from a network (e.g., the Internet or a telecommunications network) (not shown). The pairing system 290 may process this information to determine which tasks should be paired (e.g., matched, assigned, distributed, routed) with which agents.

For example, in an L1 state, multiple agents may be available and waiting for connection to a task, and a task arrives at the task assignment system 200 via a network or the central switch 270. As explained above, without the pairing system 290, a switch will typically automatically distribute the new task to whichever available agent has been waiting the longest amount of time for an agent under a FIFO strategy, or whichever available agent has been determined to be the highest-performing agent under a PBR strategy. With the pairing system 290, contacts and agents may be given scores (e.g., percentiles or percentile ranges/bandwidths) according to a pairing model or other artificial intelligence data model, so that a task may be matched, paired, or otherwise connected to a preferred agent.

In an L2 state, multiple tasks are available and waiting for connection to an agent, and an agent becomes available. These tasks may be queued in a switch such as a PBX or ACD device. Without the pairing system 290, a switch will typically connect the newly available agent to whichever task has been waiting on hold in the queue for the longest amount of time as in a FIFO strategy or a PBR strategy when agent choice is not available. In some task assignment centers, priority queuing may also be incorporated, as previously explained. With the pairing system 290 in this L2 scenario, as in the L1 state described above, tasks and agents may be given percentiles (or percentile ranges/bandwidths, etc.) according to, for example, a model, such as an artificial intelligence model, so that an agent becoming available may be matched, paired, or otherwise connected to a preferred task.

In the task assignment system 200, the pairing system 290 may switch between pairing strategies and benchmark the relative performance of the task assignment system under each pairing strategy (e.g., by using a benchmarking module such as benchmarking module 160 of pairing system 100). The benchmarking results may help to determine which pairing strategy or combination of pairing strategies to use to optimize or improve the overall performance of the task assignment system 200.

Given that the pairing system 290 is integrated with—or "internal" to—the task assignment system 200, handling errors that arise in association with implementing the pairing strategy (e.g., failures, outages, misconfigurations, dropped or delayed communications, or various other issues that may interfere with the ability of task assignment system 200 to use pairing system 290 to select pairings in a timely and accurate manner) may be straightforward given that the task assignment system 200 can readily access information and/or controls used to monitor, detect, and recover from such errors. However, in a task assignment system with an external pairing system, error handling (e.g., monitoring, detecting, and/or recovering from errors) may not be as straightforward, as will be described next.

Figure 3:
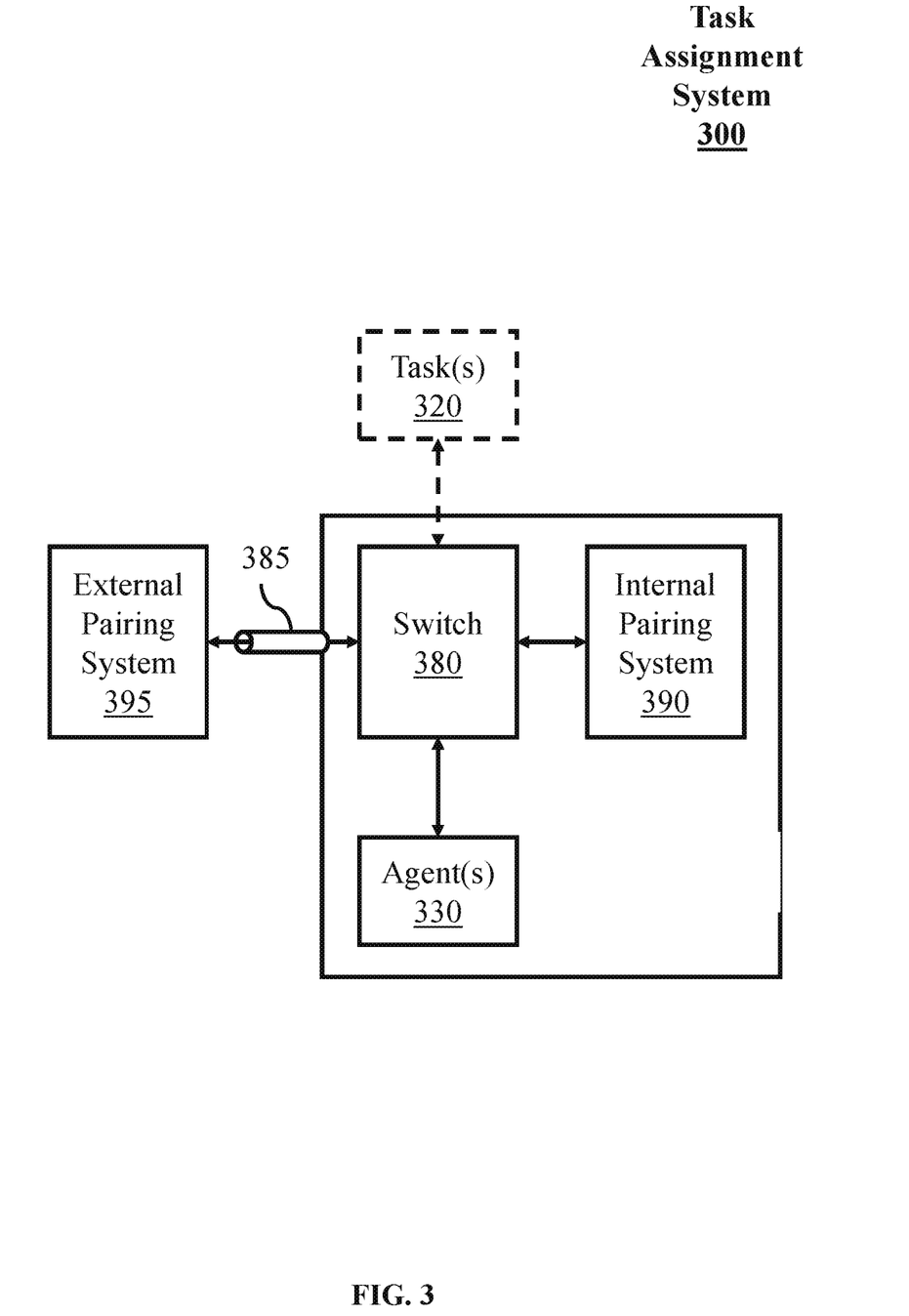
FIG. 3 shows a block diagram of a task assignment system with an external pairing system according to embodiments of the present disclosure.

FIG. 3 shows a block diagram of a task assignment system 300 with an external pairing system 395 according to embodiments of the present disclosure. In the task assignment system 300, a switch 380 may route a plurality of tasks 320 to a plurality of agents 330. The switch 380 may include routing hardware and software, or to one or more PBX or ACD routing components or other queuing or switching components for helping to route the plurality of tasks 320 among the plurality of agents 330.

In the task assignment system 300, an internal pairing system 390 may be communicatively coupled to the switch 380. The internal pairing system 390 may be native to (or built in) the task assignment system 300 (i.e., "first-party") or may be provided by a third-party vendor. Typically, the internal pairing system 390 may implement traditional pairing strategies (e.g., FIFO or PBR) or some other pairing strategy that may be proprietary to the task assignment system 300. However, the internal pairing system 390 may also be in the form of the pairing system 100. The internal pairing system 390 may receive or otherwise retrieve information from the switch 380 about the agents 330 logged into the switch 380 and about the incoming tasks 320.

In the task assignment system 300, the external pairing system 395 may be communicatively coupled to the switch 380 via an interface 385. The interface 385 may isolate the task assignment system 300 from the external pairing system 395 (e.g., for security purposes), and control information exchanged between the two systems. An example of the interface 385 may be a public or a private proprietary application programming interface (API) provided over a network (e.g., the Internet or a telecommunications network) (not shown).

Relative to the internal pairing system 390, the external pairing system 395 may have access to less information associated with switch 380, e.g., a limited subset of information that is selected and shared by the switch 380. Similarly, switch 380 may have access to less information associated with the external pairing system 395 than the internal pairing system 390. Moreover, relative to the internal pairing system 390, the external pairing system 395 may have less control over the operation of switch 380, and vice versa. Such information and/or control is generally sufficient for the external pairing system 395 to determine the task-agent pairing and convey the determined task-agent pairing to switch 380. The external pairing system 395 may be provided by a third-party vendor and may be in the form of the pairing system 100 described above. The external pairing system 395 may provide a pairing strategy (e.g., BP) that improves the performance of the task assignment system 300 when compared to the pairing strategy (or strategies) of the internal pairing system 390. The external pairing system 395 may also provide the same or a similar pairing strategy as that of the internal pairing system 390.

In some embodiments, the external pairing system 395 may be configured to assign tasks and/or agents that are associated with one or more skills. Skills generally correspond to classifications of tasks and/or agents based on the subject matter or the field of expertise involved in handling the task. Examples of skills include, but are not limited to, language skills (e.g., Spanish, English, French), sales skills, customer retention skills, technical support skills, etc. The set of skills that the external pairing system 395 is configured to handle may be shared with task assignment system 300, e.g., during a policy exchange, in a shared configuration file, or the like. In some embodiments, the task assignment system 300 may limit the sharing of information (e.g., information about new tasks and/or agents) with the external pairing system 395 to information pertaining to the set of skills that the external pairing system 395 is configured to handle. Other information (e.g., information pertaining to skills that the external pairing system 395 is not configured to handle) may be hidden from the external pairing system 395.

The task assignment system 300 may operate under a shared control, in which the switch 380 may send route requests to either or both of the internal pairing system 390 and the external pairing system 395 to determine which task is to be routed to which agent. The shared control may be desirable, for example, when the internal pairing system 390 employs a traditional or proprietary pairing strategy (e.g., FIFO or PBR) that may not be provided by the external pairing system 395, while the external pairing system 395 is used to provide a higher-performing pairing strategy (e.g., BP).

When the external pairing system 395 includes the same or a similar pairing strategy as that of the internal pairing system 390, the task assignment system 300 may operate under full control such that the switch 380 sends all route requests to the external pairing system 395. In other words, the external pairing system 395 has full control over determining every task-agent pairing. Under full control, at times, the external pairing system 395 may simulate/mimic the pairing strategy of the internal pairing system 390 (e.g., FIFO or PBR) and, at other times, employ a different pairing strategy (e.g., BP), and send its pairing recommendation to the switch 380 over the interface 385. The switch 380 may then assign the tasks 320 to agents 330 based on the pairing recommendation. In some embodiments, shared control and full control may be a preconfigured setting in the task assignment system 300. In other embodiments, the task assignment system 300 may switch between shared control and full control automatically during runtime or by receiving input from a task assignment system manager or operator. The task assignment system 300 may use a control flag to indicate whether a historical task was assigned by the internal pairing system 390 or the external pairing system 395. The task assignment system 300 may share the control flag with the external pairing system 395 (e.g., for benchmarking purposes) over the interface 385.

Under either shared control or full control, the task assignment system 300 may use a second flag—a benchmark flag—to indicate whether a task is an "ON" task or an "OFF" task. An ON task is a task designated to be assigned by the external pairing module 395 using a higher-performing pairing strategy (e.g., BP). An OFF task is a task designated to be assigned using a traditional pairing strategy (e.g., FIFO or PBR) by either the internal pairing module 390 or the external pairing module 395. When operating in shared control, the task assignment system 300 (or the switch 380) may determine which of the tasks 320 should be ON or OFF. In full control, the task assignment 300 may either mark tasks as ON or OFF prior to sending route requests to the external pairing system 395 or send the route requests to the external pairing system 395 and allow the external pairing system 395 to determine which of the task should be treated as ON or OFF. The determination of the whether a task should be ON or OFF may be based on one or more predetermined schemes or an agreement between the task assignment system 300 and the external pairing system 395. See U.S. Pat. No. 9,712,676.

In some embodiments, the benchmark flag may also be used to indicate that a historical task was paired to an agent by the internal pairing system 390 when the task should have been paired by the external pairing system 395 (i.e., ON tasks under shared control, or both ON and OFF tasks under full control). In these situations, the benchmark flag may be set to a third value, e.g., "default" instead of "ON" or "OFF"). Historical task assignments flagged as "Default" may be excluded from benchmarking calculations in some embodiments given that such assignments may have been due to unintentional errors or failures in the task assignment system 300.

The task assignment system 300 is illustrated as having a single queue with the single switch 380 for simplicity. The task assignment system 300 could include additional queues with corresponding switches, in which case, either each switch could be communicatively coupled to the internal pairing system 390 and the external pairing system 395, or there could be an internal pairing system and an external pairing system for each switch. In some embodiments, one or more queues may be configured as skill queues, each of which are associated with one or more skills. The task assignment system 300 may add tasks and/or agents associated with one or more skills to a matching skill queue. Other queues may be configured as general queues that handle any type of task and/or agent.

In some embodiments, one or more queues of the task assignment system 300 may be hidden from the external pairing system 395. That is, a limited amount of information, or no information, associated with tasks and/or agents that is stored in a hidden queue may be shared with external pairing system 395. For example, a skill queue may be hidden from external pairing system 395 when the one or more skills of the skill queue are incompatible with the one or more skills that the external pairing system 395 is configured to handle (e.g., there is no overlap in the respective skill sets). Because the task assignment system does not share information about the skill queue with the external pairing system 395, the external pairing system 395 may be unable to select pairing for tasks and/or agents that are stored in the skill queue.

Figure 4:
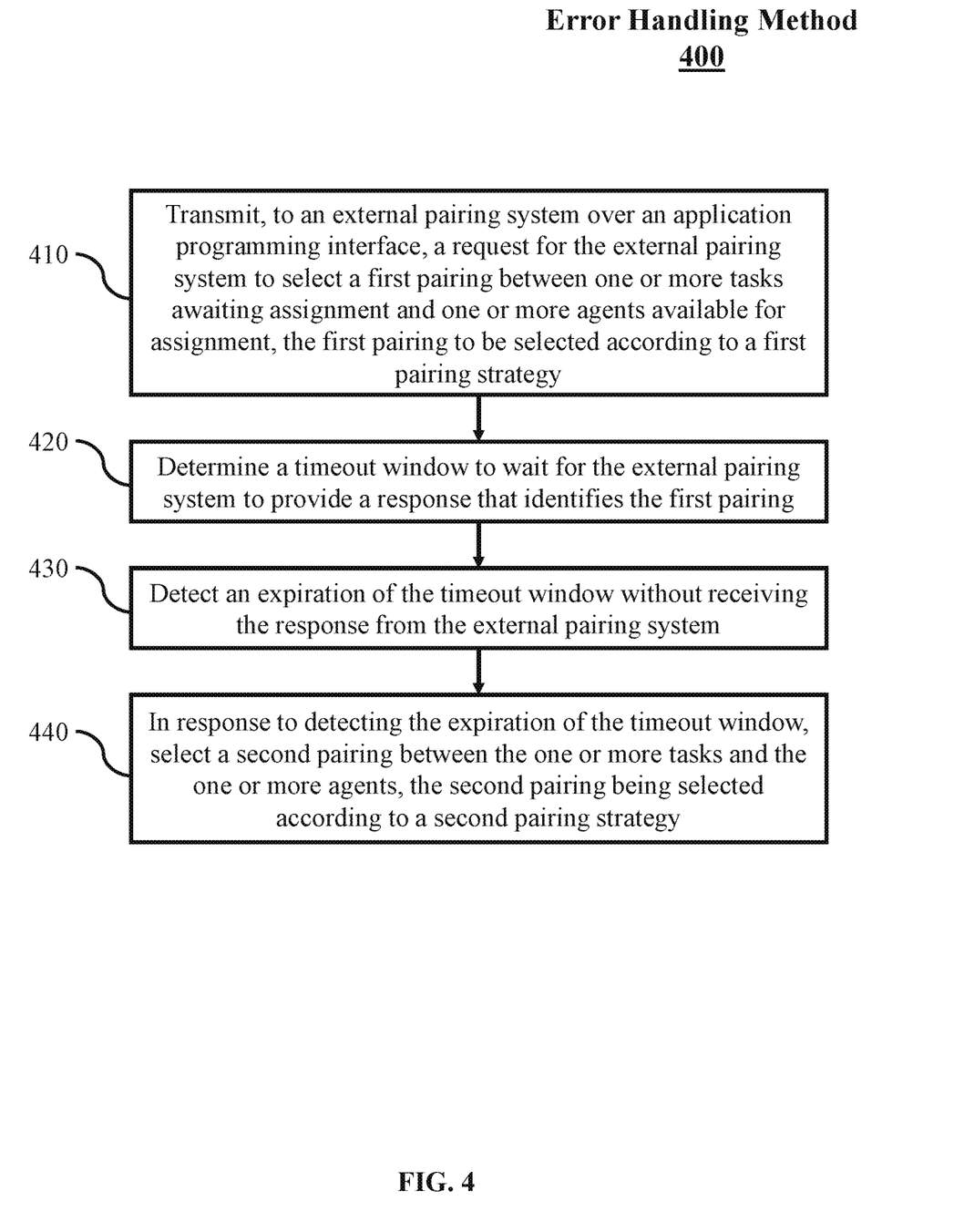
FIG. 4 shows a flow diagram of an error handling method for a task assignment system with an external pairing system according to embodiments of the present disclosure.

FIG. 4 shows a flow diagram of an error handling method 400 for a task assignment system (e.g., task assignment system 300) with an external pairing system (e.g., external pairing system 395) according to embodiments of the present disclosure.

The error handling method 400 may begin at block 410. At block 410, a request for the external pairing system to select a first pairing between one or more tasks awaiting assignment and one or more agents available for assignment (e.g., a pairing request, a routing request, etc.) may be transmitted to the external pairing system over an API. In some embodiments, the first pairing is to be selected according to a first pairing strategy implemented by the external pairing system. For example, the first pairing strategy may be the BP strategy, e.g., when the task assignment system is operating in the full control mode, or either the BP strategy or a traditional pairing strategy, such as FIFO or PBR, e.g., when the task assignment system is operating in shared control mode. Various information may be transmitted to the external pairing system to enable the external pairing system to select the first pairing, such as information that identifies the one or more tasks and the one or more agents, control flags, or the like. Under normal conditions, the transmitted request may be received by the external pairing system. However, due to transmission errors (e.g., network faults) or other types of errors, the request may fail to reach the external pairing system.

At block 420, a timeout window to wait for the external pairing system to provide a response that identifies the first pairing may be determined. In some embodiments, a timer may be set for a predetermined amount of time corresponding to the timeout window upon transmitting the request at block 410. In general, the duration of the timeout window may be selected to provide enough time for the external pairing system to respond under normal conditions (e.g., accounting for routine transmission delays and latency) without timing out. In some embodiments, the duration of the timeout window may be fixed or flexible. For example, the duration of the timeout window may depend on dynamic network conditions, the location of the external pairing system relative to the task assignment system, the average latency for communications between the task assignment system and the external pairing system, the complexity of the request, or the like.

At block 430, an expiration of the timeout window without receiving the response from the external pairing system may be detected. For example, a timer set at block 420 may time out before the response is received. The timeout window may expire after an initial duration determined at block 420, or after an extended duration in response to the timeout window being extended during the initial timeout window. For example, the timeout window may be extended when, during the initial timeout window, an extension request that includes an instruction to extend the timeout window is received from the external pairing system. Illustratively, the extension request may be received when the current state of the task assignment system (e.g., the number of permutations between tasks and agents, the environment (L1, L2, or l3), or the like) would result in suboptimal performance of the first pairing strategy. In such cases, the external pairing system may determine to postpone making a pairing selection until the state of the task assignment system develops into the preferred state (e.g., by waiting for more tasks and/or agents to become available, waiting for the environment to develop into an L3 environment, or the like). Illustrative processes for postponing the selection of pairings are described in detail in, e.g., U.S. Pat. No. 10,257,354, which is incorporated by reference herein. However, the number of extension requests that may be granted and/or the total duration of the extended timeout window may be limited. Accordingly, the timeout window may expire at block 430 despite the duration of the timeout window being extended.

When the timeout window lapses without receiving a response from the external pairing system, it may be determined that an error or fault occurred. For example, it may be determined that the request or the response encountered an error in transmission, the external pairing system may be experiencing an outage or otherwise be inaccessible, the format of the request or the response may be invalid or incompatible with the API, the external pairing system or the task assignment system may be misconfigured, or the like. When it is determined that an error or fault has occurred, one or more remedial actions may be taken. Illustrative examples of remedial actions can include, but are not limited to, resending the pairing request (e.g., returning to block 420), notifying an operator of the task assignment system and/or the external pairing system that an error has been detected, logging system information to assist with debugging the error, or the like. Moreover, to limit or prevent the formation of a backlog of tasks and/or agents awaiting assignment, the error handling method 400 may proceed to block 440 for selecting a pairing for the task using the internal pairing system, thereby providing a failover mechanism to address the detected misconfiguration.

At block 440, in response to detecting the expiration of the timeout window, a second pairing between the one or more tasks and the one or more agents may be selected. In some embodiments, the second pairing may be selected according to a second pairing strategy. For example, the second pairing strategy may be one of FIFO and PBR. The second pairing strategy may be implemented by an internal pairing system (e.g., internal pairing system 390), or by a backup external pairing system. By executing the second pairing strategy using the internal pairing system, the formation of a backlog of tasks and/or agents awaiting assignment may be limited or prevented, even when the error associated with the external pairing system remains unresolved. This failover mechanism can be used as the sole remedial action, or it can also be used in conjunction with other remedial actions, used after other remedial actions have been tried but are ineffective, or the like.

In some embodiments, the one or more tasks awaiting assignment may be labeled to indicate which pairing strategy should be used to pair to the task. For example, the label can include a benchmarking flag. Illustratively, an ON task (e.g., a task for which the corresponding label is ON) may designate a task that is to be paired according to the first pairing strategy. An OFF task (e.g., a task for which the corresponding label is OFF) may designate a task that is to be paired according to the second pairing strategy. In full control mode or shared control mode, the external pairing system may assume responsibility for pairing ON tasks with agents. However, in response to the expiration of the timeout window being detected, the task assignment system may transition from a first mode (e.g., the full control mode or the shared control mode) to a second mode (e.g., an error response mode). In the error response mode, the label associated with the one or more tasks (e.g., the ON flag associated with ON tasks) may be overridden. In this manner, the internal pairing system of the task assignment system, rather than the external pairing system, may assume responsibility for pairing ON tasks with agents. In some embodiments, to limit interference with subsequent benchmarking calculations, the label may be changed to a different value (e.g., the benchmarking flag may be set to a "default" flag) to indicate that tasks that are assigned in the error recovery mode should not later be used in the external pairing system's benchmarking calculations, even if they were originally designated as ON tasks.

Figure 5:
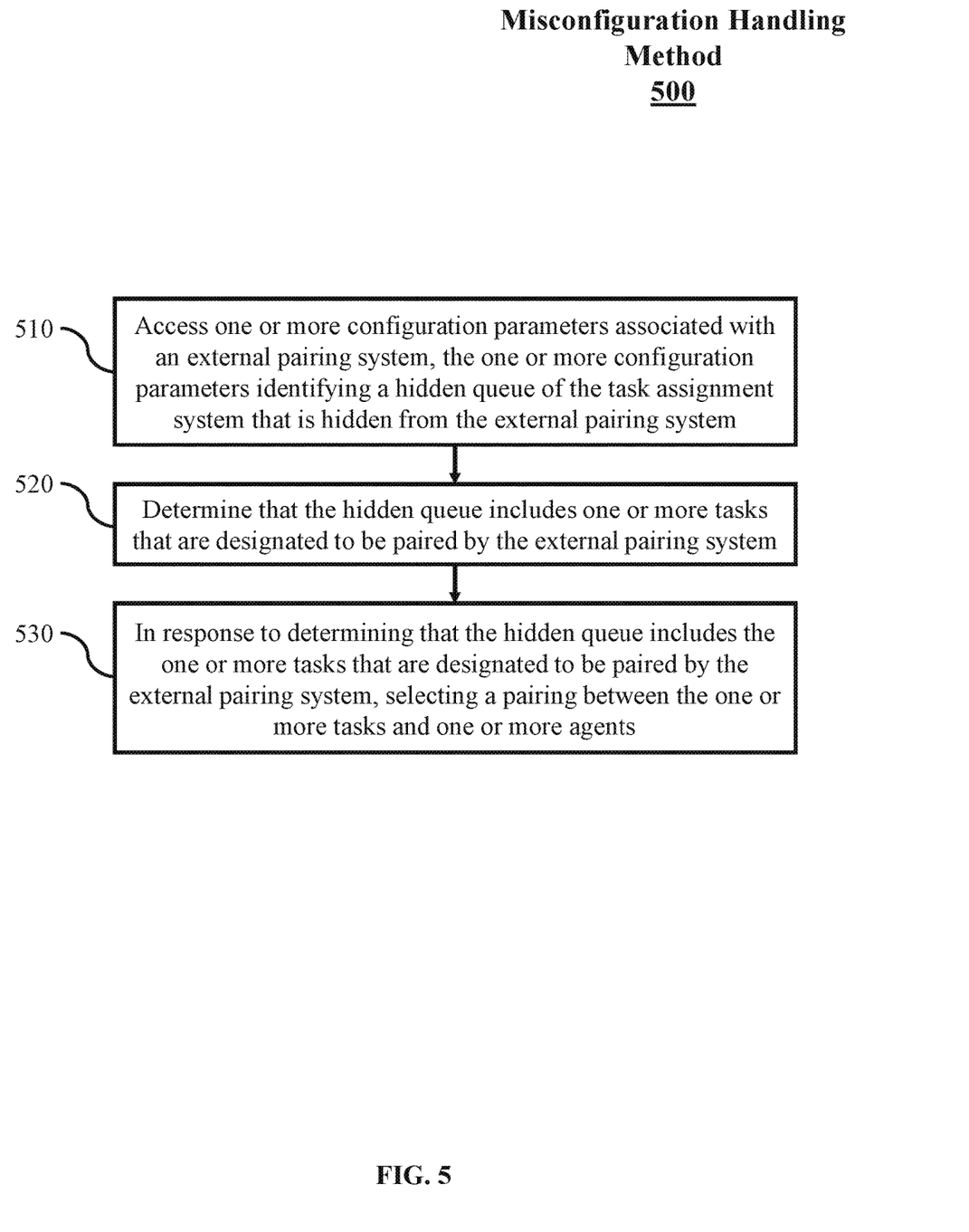
FIG. 5 shows a flow diagram of a misconfiguration handling method for a task assignment system with an external pairing system according to embodiments of the present disclosure.

FIG. 5 shows a flow diagram of a misconfiguration handling method 500 for a task assignment system (e.g., task assignment system 300) with an external pairing system (e.g., external pairing system 395) according to embodiments of the present disclosure. In some embodiments, the misconfiguration handling method 500 may be performed in conjunction with, or independently of, the error handling method 400. Whereas the error handling method 400 provides techniques for detecting and responding to errors in which the external pairing system fails to respond to a pairing request in the expected manner, the misconfiguration handling method 500 provides techniques for detecting and responding to errors in which the external pairing system may not even be asked to suggest a pairing. The latter scenario may arise due to, e.g., misconfigurations in which tasks that are designated to be paired by the external pairing system are inadvertently hidden from the external pairing system.

The misconfiguration handling method 500 may begin at block 510. At block 510, one or more configuration parameters associated with the external pairing system may be accessed. The one or more configuration parameters may include information that identifies a hidden queue of the task assignment system that is hidden from the external pairing system. When a queue is a hidden queue, the external pairing system may not be sent updated information about tasks that are stored in or added to the hidden queue, and/or may not be sent requests to select a pairing for tasks that are stored in or added to the hidden queue. In some embodiments, a queue may be hidden when the external pairing system is associated with one or more first skills, and the queue is a skill queue associated with a second skill that is not among the one or more first skills. Because the respective skill sets are mismatched or incompatible, the external pairing system is not equipped to handle the pairing of tasks or agents in the skill queue, so information associated with the skill queue may be hidden from the external pairing system. In some embodiments, the one or more configuration parameters may be stored in a configuration file. In some embodiments, the one or more configuration parameters may be associated with a policy exchange between the task assignment system and the external pairing system, where the policy includes one or more rules for managing interactions between the task assignment system and the external pairing system.

At block 520, it may be determined that the hidden queue includes one or more tasks that are designated to be paired by the external pairing system. For example, the one or more tasks may be labeled to indicate that the one or more tasks are to be paired according to a first pairing strategy implemented by the external pairing system (e.g., a task may include an ON flag indicating that the task is an ON task). Accordingly, when the task assignment system is operating in full control mode or shared control mode, the external pairing system assumes responsibility for pairing the one or more tasks according to the first pairing strategy. However, the configuration parameters accessed at block 510 indicate that the queue containing the one or more tasks is hidden from the external pairing system. Due to this inconsistency, in the absence of intervention, the one or more tasks may wait in the hidden queue indefinitely. Consequently, detecting that the hidden queue includes tasks designated to be paired by the external pairing system may trigger one or more interventions to be taken. For example, to limit or prevent the formation of a backlog of tasks and/or agents awaiting assignment, the misconfiguration handling method 500 may proceed to block 530 for selecting a pairing for the task using the internal pairing system, thereby providing a failover mechanism to address the detected misconfiguration.

At block 530, in response to determining that the hidden queue includes one or more tasks that are designated to be paired by the external pairing system, a pairing between the one or more tasks and the one or more agents may be selected using an internal pairing system (e.g., internal pairing system 390). In some embodiments, block 530 may generally correspond to block 440 of error handling method 400. For example, the pairing may be selected according to a second pairing strategy implemented by the internal pairing system that is different from the first strategy implemented by the external pairing system. For example, the second pairing strategy may be one of FIFO and PBR. When the tasks include a label (e.g., an ON flag) that indicates that they are designated to be paired by the external pairing system, the label may be overridden. By executing the second pairing strategy using the internal pairing system, the formation of a backlog of tasks and/or agents awaiting assignment may be limited or prevented, even when the misconfiguration of the task assignment system and/or the external pairing system remains unresolved.

Figure 6:
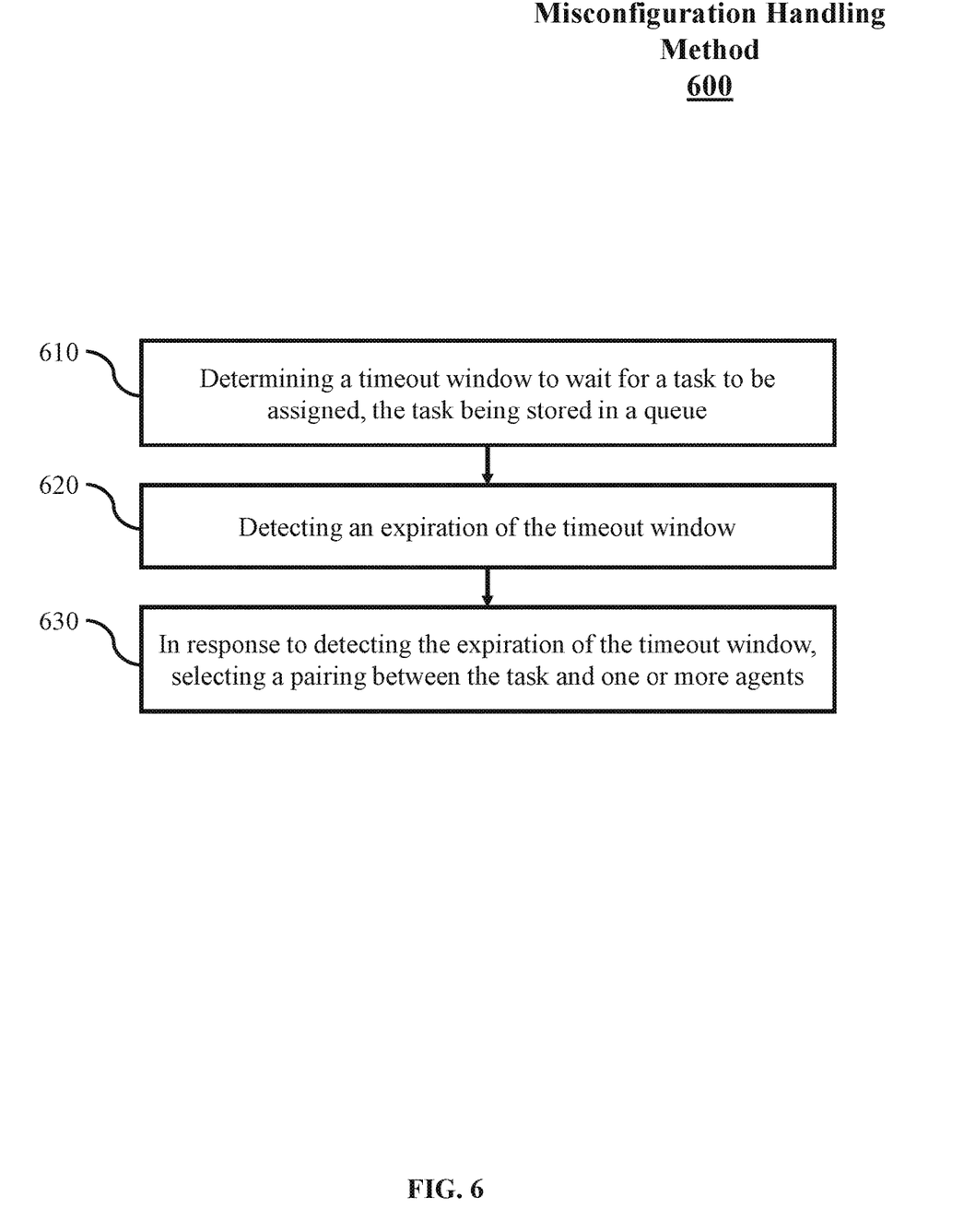
FIG. 6 shows a flow diagram of a misconfiguration handling method for a task assignment system with an external pairing system according to embodiments of the present disclosure.

FIG. 6 shows a flow diagram of a misconfiguration handling method 600 for a task assignment system (e.g., task assignment system 300) with an external pairing system (e.g., external pairing system 395) according to embodiments of the present disclosure. Relative to misconfiguration handling method 500, misconfiguration handling 600 provides an alternative process for detecting misconfigurations in which a hidden queue includes one or more tasks that are designated to be paired by the external pairing system. This alternative process may be performed in conjunction with, or independently of, misconfiguration handling method 500. Whereas misconfiguration handling method 500 detects misconfigurations by analyzing configuration parameters, misconfiguration handling method 600 detects misconfigurations using timeout windows, as discussed below.

At block 610, a timeout window to wait for a task to be assigned to an agent is determined, the task being stored in a queue. In some embodiments, a timer may be set for a predetermined amount of time upon adding the task to the queue. Accordingly, the timeout window may correspond to a maximum amount of time that the task can wait in a queue before triggering an intervention from the task assignment system. In general, the duration of the timeout window may be selected to provide enough time for the task to be assigned to an agent under normal conditions (e.g., accounting for routine waiting times) without timing out. In some embodiments, the duration of the timeout window may be fixed or flexible. For example, the duration of the timeout window may depend on the number of tasks in the queue, the number of agents available for assignment, various statistics associated with the average amount of time it takes for tasks to be assigned, the complexity of the task, or the like.

At block 620, an expiration of the timeout window is detected. For example, a timer set at block 610 may time out before the task is assigned. The timeout window may expire after an initial duration determined at block 610, or after an extended duration in response to the timeout window being extended during the initial timeout window. For example, the timeout window may be extended when, during the initial timeout window, an extension request that includes an instruction to extend the timeout window is received from the external pairing system. When the timeout window lapses without the task being assigned, it may be determined that an error or fault occurred, or that the task assignment system and/or the external pairing system are misconfigured. For example, it may be determined that the task is designated to be paired by the external pairing system (e.g., the task is an ON task), but the queue that the task was placed into is a hidden queue (e.g., the queue is a skill queue associated with a skill that is not among the skills that the external pairing system is configured to handle). Accordingly, to limit or prevent the formation of a backlog of tasks and/or agents awaiting assignment, the misconfiguration handling method 600 may proceed to block 630 for selecting a pairing for the task using the internal pairing system, thereby providing a failover mechanism to address the detected misconfiguration.

At block 630, in response to detecting the expiration of the timeout window, a pairing between the one or more tasks and the one or more agents may be selected using an internal pairing system (e.g., internal pairing system 390). In some embodiments, block 630 may generally correspond to block 440 of error handling method 400. For example, the pairing may be selected according to a second pairing strategy implemented by the internal pairing system that is different from the first strategy implemented by the external pairing system. For example, the second pairing strategy may be one of FIFO and PBR. When the tasks include a label (e.g., an ON flag) that indicates that they are designated to be paired by the external pairing system, the label may be overridden. By executing the second pairing strategy using the internal pairing system, the formation of a backlog of tasks and/or agents awaiting assignment may be limited or prevented, even when the misconfiguration of the task assignment system and/or the external pairing system remains unresolved.

The foregoing descriptions of the misconfiguration handling methods 500 and 600 are non-limiting, and various of their processes may be added, removed, modified, substituted, or rearranged without departing from the broader spirit and scope of the disclosure. Although the forgoing description of misconfiguration handling methods 500 and 600 refers to the pairing of tasks, the techniques are equally applicable to the pairing of agents (e.g., the hidden queue may include agents available for assignment rather than, or in addition to, tasks awaiting assignment).

At this point it should be noted that task assignment in accordance with the present disclosure as described above may involve the processing of input data and the generation of output data to some extent. This input data processing and output data generation may be implemented in hardware or software. For example, specific electronic components may be employed in a behavioral pairing module or similar or related circuitry for implementing the functions associated with task assignment in accordance with the present disclosure as described above. Alternatively, one or more processors operating in accordance with instructions may implement the functions associated with task assignment in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes.

The invention claimed is:

1. A method for error handling in a task assignment system with an external pairing system, the method comprising:

transmitting, by at least one computer processor communicatively coupled to and configured to operate in the task assignment system, to the external pairing system over an application programming interface, a request for the external pairing system to select a first pairing between one or more tasks awaiting assignment and one or more agents available for assignment, the first pairing to be selected according to a first pairing strategy;

determining, by the at least one computer processor, a timeout window to wait for the external pairing system to provide a response that identifies the first pairing;

detecting, by the at least one computer processor, an expiration of the timeout window without receiving the response;

in response to detecting the expiration of the timeout window, selecting, by the at least one computer processor, a second pairing between the one or more tasks and the one or more agents, the second pairing being selected according to a second pairing strategy, wherein the selecting of the second pairing is configured to cause a connection to be established between the one or more tasks and the one or more agents in a switch of the task assignment system.

2. The method of claim 1, wherein the task assignment system is a contact center system.

3. The method of claim 1, wherein the first pairing strategy is a behavioral pairing strategy.

4. The method of claim 1, wherein the second pairing strategy is one of a first-in, first-out strategy and a performance-based routing strategy.

5. The method of claim 1, wherein the second pairing is selected by an internal pairing system of the task assignment system.

6. The method of claim 1, further comprising, in response to detecting the expiration of the timeout window, transitioning from a first mode to a second mode, wherein:

the first mode corresponds to one of a full control mode and a shared control mode; and the second mode corresponds to an error response mode in which an internal pairing system of the task assignment system assumes control of pairing the one or more tasks with the one or more agents.

7. The method of claim 1, wherein the one or more tasks are associated with a label that indicates that the one or more tasks should be paired according to the first pairing strategy, and wherein the method further comprises overriding the label in response to detecting the expiration of the timeout window.

8. The method of claim 1, further comprising:
accessing, by the at least one computer processor, one or more configuration parameters associated with the external pairing system, the one or more configuration parameters identifying a hidden queue of the task assignment system that is hidden from the external pairing system;
determining, by the at least one computer processor, that the hidden queue includes one or more second tasks that are designated to be paired by the external pairing system;
in response to determining that the hidden queue includes the one or more second tasks that are designated to be paired by the external pairing system, selecting, by the at least one computer processor, a third pairing between the one or more second tasks and the one or more agents, the third pairing being selected according to the second pairing strategy.

9. The method of claim 1, further comprising:
determining, by the at least one computer processor, a second timeout window to wait for a second task to be assigned, the second task being stored in a queue;
detecting, by the at least one computer processor, an expiration of the second timeout window;
in response to detecting the expiration of the second timeout window, selecting, by the at least one computer processor, a third pairing between the second task and the one or more agents, the third pairing being selected according to the second pairing strategy.

10. A system for error handling in a task assignment system with an external pairing system comprising:
at least one computer processor communicatively coupled to and configured to operate in the task assignment system, wherein the at least one computer processor is further configured to:
transmit, to the external pairing system over an application programming interface, a request for the external pairing system to select a first pairing between one or more tasks awaiting assignment and one or more agents available for assignment, the first pairing to be selected according to a first pairing strategy;
determine a timeout window to wait for the external pairing system to provide a response that identifies the first pairing;
detect an expiration of the timeout window without receiving the response;
in response to detecting the expiration of the timeout window, select a second pairing between the one or more tasks and the one or more agents, the second pairing being selected according to a second pairing strategy, wherein the selecting of the second pairing is configured to cause a connection to be established between the one or more tasks and the one or more agents in a switch of the task assignment system.

11. The system of claim 10, wherein the task assignment system is a contact center system.

12. The system of claim 10, wherein the first pairing strategy is a behavioral pairing strategy.

13. The system of claim 10, wherein the second pairing strategy is one of a first-in, first-out strategy and a performance-based routing strategy.

14. The system of claim 10, wherein the second pairing is selected by an internal pairing system of the task assignment system.

15. The system of claim 10, wherein the at least one computer processor is further configured to, in response to detecting the expiration of the timeout window, transition from a first mode to a second mode, wherein:
the first mode corresponds to one of a full control mode and a shared control mode; and
the second mode corresponds to an error response mode in which an internal pairing system of the task assignment system assumes control of pairing the one or more tasks with the one or more agents.

16. The system of claim 10, wherein the one or more tasks are associated with a label that indicates that the one or more tasks should be paired according to the first pairing strategy, and wherein the at least one computer processor is further configured to override the label in response to detecting the expiration of the timeout window.

17. The system of claim 10, wherein the at least one computer processor is further configured to:
access one or more configuration parameters associated with the external pairing system, the one or more configuration parameters identifying a hidden queue of the task assignment system that is hidden from the external pairing system;
determine that the hidden queue includes one or more second tasks that are designated to be paired by the external pairing system;
in response to determining that the hidden queue includes the one or more second tasks that are designated to be paired by the external pairing system, select a third pairing between the one or more second tasks and the one or more agents, the third pairing being selected according to the second pairing strategy.

18. The system of claim 10, wherein the at least one computer processor is further configured to:
determine a second timeout window to wait for a second task to be assigned, the second task being stored in a queue;
detect an expiration of the second timeout window;
in response to detecting the expiration of the second timeout window, select a third pairing between the second task and the one or more agents, the third pairing being selected according to the second pairing strategy.

19. An article of manufacture for error handling in a task assignment system with an external pairing system comprising:
a non-transitory processor readable medium; and
instructions stored on the medium;
wherein the instructions are configured to be readable from the medium by at least one computer processor communicatively coupled to and configured to operate in the task assignment system and thereby cause the at least one computer processor to operate so as to:
transmit, to the external pairing system over an application programming interface, a request for the external pairing system to select a first pairing between one or more tasks awaiting assignment and one or more agents available for assignment, the first pairing to be selected according to a first pairing strategy;
determine a timeout window to wait for the external pairing system to provide a response that identifies the first pairing;

detect an expiration of the timeout window without receiving the response;

in response to detecting the expiration of the timeout window, select a second pairing between the one or more tasks and the one or more agents, the second pairing being selected according to a second pairing strategy, wherein the selecting of the second pairing is configured to cause a connection to be established between the one or more tasks and the one or more agents in a switch of the task assignment system.

20. The article of manufacture of claim 19, wherein the task assignment system is a contact center system.

21. The article of manufacture of claim 19, wherein the first pairing strategy is a behavioral pairing strategy.

22. The article of manufacture of claim 19, wherein the second pairing strategy is one of a first-in, first-out strategy and a performance-based routing strategy.

23. The article of manufacture of claim 19, wherein the second pairing is selected by an internal pairing system of the task assignment system.

24. The article of manufacture of claim 19, wherein the instructions are further configured to cause the at least one computer processor to operate so as to, in response to detecting the expiration of the timeout window, transition from a first mode to a second mode, wherein:

the first mode corresponds to one of a full control mode and a shared control mode; and the second mode corresponds to an error response mode in which an internal pairing system of the task assignment system assumes control of pairing the one or more tasks with the one or more agents.

25. The article of manufacture of claim 19, wherein the one or more tasks are associated with a label that indicates that the one or more tasks should be paired according to the first pairing strategy, and wherein the instructions are further configured to cause the at least one computer processor to operate so as to override the label in response to detecting the expiration of the timeout window.

26. The article of manufacture of claim 19, wherein the instructions are further configured to cause the at least one computer processor to operate so as to:

access one or more configuration parameters associated with the external pairing system, the one or more configuration parameters identifying a hidden queue of the task assignment system that is hidden from the external pairing system;

determine that the hidden queue includes one or more second tasks that are designated to be paired by the external pairing system;

in response to determining that the hidden queue includes the one or more second tasks that are designated to be paired by the external pairing system, select a third pairing between the one or more second tasks and the one or more agents, the third pairing being selected according to the second pairing strategy.

27. The article of manufacture of claim 19, wherein the instructions are further configured to cause the at least one computer processor to operate so as to:

determine a second timeout window to wait for a second task to be assigned, the second task being stored in a queue;

detect an expiration of the second timeout window;

in response to detecting the expiration of the second timeout window, select a third pairing between the second task and the one or more agents, the third pairing being selected according to the second pairing strategy.

* * * * *